United States Patent Office 2,854,440
Patented Sept. 30, 1958

2,854,440

COPOLYMER OF ACRYLONITRILE AND CYANO ETHER-ESTERS

Roland J. Kern, Miamisburg, Ohio, assignor to Monsanto Chemical Company, St. Louis, Mo., a corporation of Delaware No Drawing. Application August 11, 1955
Serial No. 527,870

2 Claims. (Cl. 260—85.5)

This invention relates to new copolymers which are capable of fabrication into desirable transparent flexible films. More particularly the invention relates to copolymers of acrylonitrile and certain cyano ether-esters.

The primary purpose of this invention is to prepare novel synthetic elastomeric compositions having an unusual combination of flexibility and solvent resistance. A further purpose of this invention is to provide new elastomeric compositions for use in the coatings industry. Still another object is the provision of improved emulsion latices for the coatings industry.

It has been found that certain cyano ether-esters and acrylonitrile give very desirable compositions when copolymerized in suitable proportions. The preferred proportions employed for producing the new copolymers may consist generally of from 30 to 95 percent of the cyano ether-ester, although the more valuable products are prepared utilizing from 40 to 90 percent by weight of the ester in the copolymer, with the balance being acrylonitrile.

The cyano esters useful for the preparation of the present copolymers are acrylates having the formula

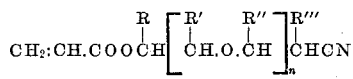

in which R, R', R" and R''' are selected from the class consisting of hydrogen and the methyl radical and $n$ is an integer of from 1 to 3.

Compounds having the above formula are disclosed in the Mowry and Ringwald U. S. Patent No. 2,669,558. They are obtainable by contacting, in the presence of an esterifying agent, acrylic acid or an acid halide thereof such as acrylyl chloride with a hydroxy alkoxy nitrile having the formula

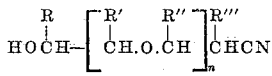

in which R, R', R" and R''' are as defined above. Hydroxy alkoxy nitriles having this formula are easily obtainable by the addition of acrylonitrile or methacrylonitrile to an appropriate alkylene glycol or an appropriate polyalkyene glycol.

Examples of cyano ether-esters which may be copolymerized with acrylonitrile to yield the present synthetic elastomers are 2-(2-cyanoethoxy)ethyl acrylate which is obtainable from acrylic acid and β-(2-hydroxyethoxy)-propionitrile, 2-(2-cyanopropoxy)ethyl acrylate which is obtainable from acrylic acid and β-(2-hydroxyethyl)-isobutyronitrile, 2-[2-(2-cyanoethoxy)ethoxy]ethyl acrylate which is obtainable from acrylic acid and β-[2-(2-hydroxyethoxy)ethoxy]propionitrile, 2-(2-cyanoethoxy)-isopropyl acrylate which is obtainable from acrylic acid and β-(2-hydroxypropoxy)propionitrile, etc.

The new copolymers may be prepared by any of the several polymerization methods known to the art, but the emulsion polymerization method is the most effective. In the practice of the emulsion polymerization technique, monomers are contacted in the presence of water which contains dissolved therein a suitable peroxy catalyst and preferably an emulsion stabilizing agent. If desired, all of the monomers may be charged to the polymerization reactor at the beginning of the reaction, or they may be added periodically or gradually throughout the course of the reaction. Similarly, the catalyst and emulsifying agents may also be introduced either at the start or in increments during the reaction. The preferred method of conducting the polymerization involves the mixing of the monomers in the desired proportions and adding the mixture gradually to a reaction vessel maintained under the desired conditions for polymerization.

The emulsion polymerizations are catalyzed by means of any water-soluble peroxy compound, for example, sodium peroxide, hydrogen peroxide, sodium perborate or persulfate, the sodium salts of other peroxy acids, the potassium, ammonium and other water-soluble salts of peroxy acids, and any other water-soluble compounds containing a peroxy radical. The quantity of peroxy compound may be from 0.05 to 2.0 percent by weight of the polymerizable compound. The catalyst may be charged at the beginning of the reaction or it may be added continuously or in increments throughout the course of the reaction for the purpose of maintaining a more uniform concentration of catalyst in the reaction mass. The latter method is preferred because it tends to make the resultant polymer more uniform in physical and chemical properties.

Although the uniform distribution of the reactants throughout the reaction mass can be achieved by vigorous agitation, it is generally desirable to promote the uniform distribution of reagents by using wetting agents, or emulsion stabilizers. Suitable agents for this purpose are the water-soluble salts of fatty acids, such as sodium oleate, and potassium stearate, mixtures of water-soluble fatty acid salts, such as the common soaps prepared by the saponification of animal and vegetable oils, the "amino soaps," such as triethanolamine and dodecyl methyl amine, salts of rosin acids and mixtures thereof, the water-soluble salts of half esters of sulfuric acid and long chain alkyl alcohols, sulfonated hydrocarbons, such as alkylarylsulfonates, and any other of the wide variety of wetting agents, which are in general organic compounds containing both hydrophobic and hydrophilic radicals. The quantity of emulsifying agent will depend upon the particular agent selected, the ratio of monomer to be used, and the conditions of polymerization. In general, however, from 0.1 to 5 percent by weight of the monomer may be employed.

The emulsion polymerization reactions are conducted at temperatures between 30° and 70° C., but preferably at the reflux temperature of the emulsion. The polymerization temperatures should be maintained substantially constant, and by operation at reflux temperatures the rate of addition of the monomers may be regulated so as to maintain the temperature more nearly constant. Under such conditions the optimum quantity of the product is obtained.

The reaction is preferably initiated by charging the reactor with water containing the catalyst and emulsifier in solution, and thereafter adding the monomer gradually at rates which enable the maintenance of a constant temperature. If desired, the monomers may each be added in a separate stream of premixed monomer. In order to avoid unduly high concentrations of emulsifier in the reaction mass at the beginning of the reaction most of it may be mixed with the monomer and added therewith during the reaction. Preferably, only a small proportion of the catalyst is charged at the beginning of the reaction and the remainder is added either continuously or intermittently throughout the course of the reaction. The preferred manner of operation involves heating the water containing a small amount of catalyst and emulsifier to approximately the ultimate polymerization temperature and initiating the reaction by introducing the stream of mixed monomers.

The emulsion polymerizations are conducted in metal, glass or glass-lined vessels, which are provided with means for agitating the contents thereof. Generally, rotary stirring devices are the most effective means of insuring the intimate contact of the reagents, but other methods may successfully be employed, for example, by rocking or tumbling the reactor. The polymerization equipment generally used is conventional in the art and the fundamental consideration involved in the selection of the equipment is the type of reaction contemplated.

The new copolymers are advantageously employed in the coatings and plastics industry. They form flexible films suitable for various wrapping applications and are also suited to compression molding methods by reason of their toughness and tensile strength. They are particularly useful as rubber-like bases in the formulation of emulsion type coatings because they display very good resistance to many volatile solvents, particularly to the aromatic and aliphatic hydrocarbons, aliphatic alcohols and esters and the lower chlorinated alkanes. Films cast from emulsions of the present copolymer have good flexibility and color.

Further details of the practice of this invention are set forth with respect to the following specific examples:

*Example 1*

A mixture consisting of 10 grams of 2-(2-cyanoethoxy)-ethyl acrylate, 10 grams of acrylonitrile, 100 cc. of water, 0.3 gram of an lauryl sulfate emulsifier known to the trade as "Duponol ME," 0.1 gram of potassium persulfate and 0.02 gram of sodium bisulfite was charged to a flask. The flask was swept out with nitrogen and sealed, and then placed on a rotating rack and maintained thereon at 43 R. P. M. for a time of 22 hours at a temperature of 60° C. The reaction mixture was then filtered to remove the small quantity of solid which was present. A film cast from the filtrate on a glass plate was flexible, clear and colorless. It was found to be resistant to water, benzene, toluene, xylene, ethyl acetate, carbon tetrachloride, hexane, methanol, chloroform, and tetrahydrofuran. The solvent resistance of the present copolymer is remarkable, for films cast from similarly prepared emulsions of 2-(2-cyanoethoxy)ethyl acrylate homopolymers turn cloudy and blister on contact with water and are attacked by methanol and ethyl acetate.

*Example 2*

This example is like Example 1 except that in the present instance there was employed 14 grams, instead of 10 grams, of the 2-(2-cyanoethoxy)ethyl acrylate and there was used 7 grams instead of 10 grams of acrylonitrile. Films cast from the resulting filtered emulsion were tested by the Clash-Berg method and were found to have a low temperature flexibility value of 6° C. and a Stifflex range of 21° C. They showed good resistance to all the solvents against which tests were conducted in Example 1 except chloroform and tetrahydrofurfuryl alcohol, against which only fair resistance was demonstrated.

*Example 3*

This example is like Example 1 except that in this instance there were used 16 grams instead of 10 grams of the 2-(2-cyanoethoxy)ethyl acrylate and 4 grams instead of 10 grams of acrylonitrile. When tested by the Clash-Berg method films cast from the filtered emulsion had a low temperature flexibility value of minus 10° C. and a Stifflex range of 20° C. They were found to have good resistance to water, benzene, xylene, toluene, ethyl acetate, the organic phosphate-base functional fluid "Skydrol 500," carbon tetrachloride, hexane and methanol.

Operating as in the above examples valuable emulsion latices of copolymers of other of the present cyano ether-esters and acrylonitrile are similarly prepared. Thus, instead of employing 2-(2-cyanoethoxy)ethyl acrylate with the acrylonitrile there may be used 2-[2-(2-cyanoethoxy)-ethoxy]ethyl acrylate, 2-(2-cyanoethoxy)-isopropyl acrylate or 2-(2-cyanopropoxy)ethyl acrylate. As little as 5 percent of acrylonitrile may be used with these esters to give copolymers of improved solvent resistance. Copolymers of substantially equal proportions of the cyano ether-ester and acrylonitrile are characterized not only by very good resistance to solvents, but also by very good heat-resistance properties.

What is claimed is:

1. A copolymer of 2-(2-cyanoethoxy)ethyl acrylate, said copolymer containing between 40 percent and 90 percent by weight of said acrylate, with the balance being acrylonitrile.

2. The process of forming a copolymer which comprises heating, in the presence of a polymerization catalyst, a mixture comprising 2-(2-cyanoethoxy)ethyl acrylate and acrylonitrile, said mixture consisting of from 40 percent to 90 percent by weight of the acrylate, with the balance being acrylonitrile.

References Cited in the file of this patent

UNITED STATES PATENTS

| | | |
|---|---|---|
| 2,583,327 | D'Alelio | Jan. 22, 1952 |
| 2,669,558 | Mowry | Feb. 16, 1954 |
| 2,720,512 | Butler | Oct. 11, 1955 |